United States Patent [19]

McNeely

[11] Patent Number: 4,460,656
[45] Date of Patent: Jul. 17, 1984

[54] VIDEO DISC PREFORM AND METHOD OF MAKING A DISC THEREFROM

[75] Inventor: Michael L. McNeely, Indianapolis, Ind.

[73] Assignee: RCA Corporation, New York, N.Y.

[21] Appl. No.: 66,769

[22] Filed: Aug. 15, 1979

[51] Int. Cl.³ .............................................. B32B 1/00
[52] U.S. Cl. ........................... 428/542.8; 264/107; 264/331.11; 264/DIG. 64; 264/DIG. 66
[58] Field of Search .................... 346/137; 360/135; 428/156, 64, 65, 66, 542, 542.8; 264/107, 106, 320, 331.11, DIG. 64, DIG. 66, DIG. 84; 156/87

[56] References Cited

U.S. PATENT DOCUMENTS

| 2,743,478 | 5/1956 | Harlow et al. | |
|---|---|---|---|
| 3,412,427 | 11/1968 | Flusfeder et al. | |
| 3,622,427 | 11/1971 | Kelly | 428/156 |
| 3,635,622 | 1/1972 | Wechsler | |
| 3,932,097 | 1/1976 | Press | |
| 4,267,237 | 5/1981 | Duperray et al. | 428/325 |

FOREIGN PATENT DOCUMENTS

| 2639118 | 12/1977 | Fed. Rep. of Germany | |
|---|---|---|---|
| 457767 | of 1950 | Italy | 264/107 |
| 946102 | 1/1964 | United Kingdom | 264/107 |
| 1524903 | 9/1978 | United Kingdom | 264/107 |

OTHER PUBLICATIONS

Bartolini et al., Optical Disk Systems Emerge, Aug. 1978, IEEE, Spectrum, pp. 20-28.

Primary Examiner—Stanley Silverman
Attorney, Agent, or Firm—Birgit E. Morris; Donald S. Cohen

[57] ABSTRACT

A preform for use in making a video recorded disc in a body of plastic material having substantially flat top and bottom surfaces and a peripheral surface extending between the top and bottom surfaces. The peripheral surface includes a first portion intermediate the top and bottom surfaces and of a peripheral size greater than that of the top and bottom surfaces. Second and third portions extend from the first portion to the top and bottom surface, respectively. Each of the second and third portions has a peripheral dimension which decreases from that of the first portion to that of the top or bottom surface so that the surface of each of the second and third portions is angled away from the top and bottom surfaces, respectively. When the preform is engaged by the molds for making a disc the angled surfaces of the second and third portions serve to minimize if not eliminate the trapping of air and gasses along the surface of the record being formed which cause defects in the record surface.

3 Claims, 3 Drawing Figures

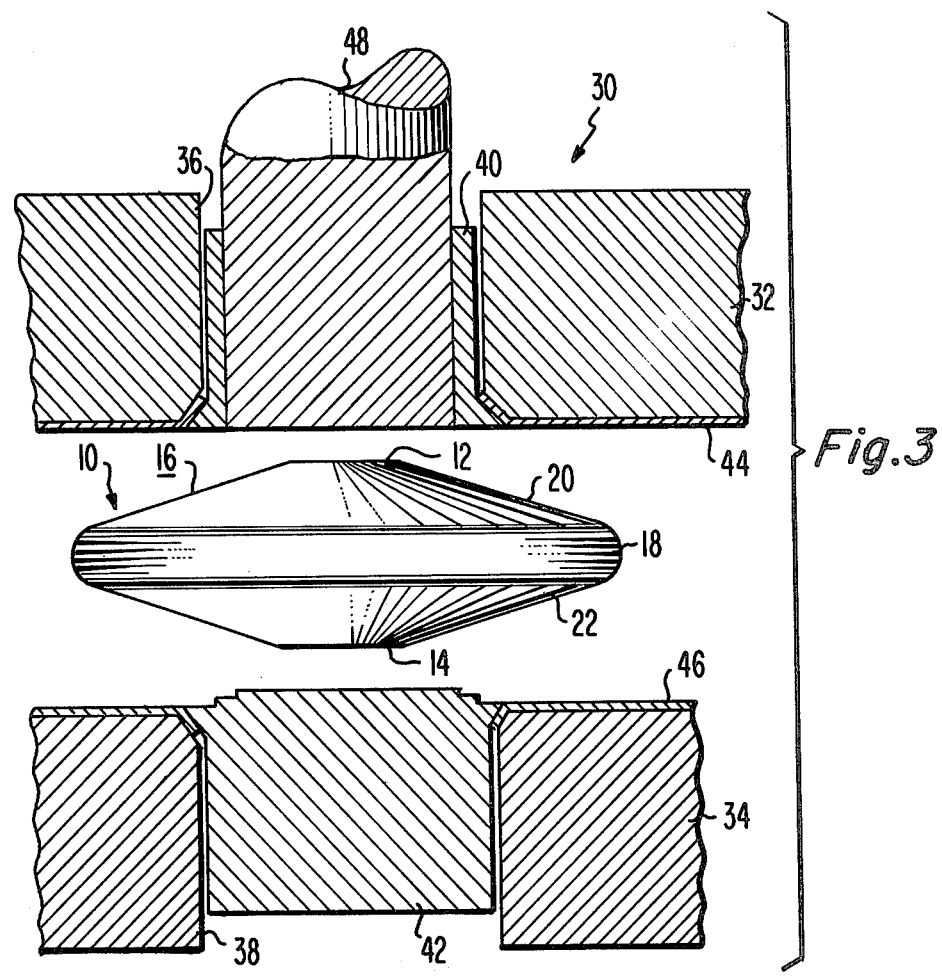

VIDEO DISC PREFORM AND METHOD OF MAKING A DISC THEREFROM

BACKGROUND OF THE INVENTION

The present invention relates to a preform for use in making a video disc record and the method of making a disc therefrom and more particularly to such a preform which results in the reduction of such defects as voids, blisters and pits on the surface of the disc.

Disc records are typically made by placing a plastic preform centrally between a pair of heated molds. The molds are closed against the preform causing the plastic to flow radially outwardly to fill the mold cavity and define the record contour. The preforms heretofore used had flat top and bottom surfaces extending completely across the peripheral surface, which was generally cylindrical. A problem with this type of preform is that the flat surfaces are not completely smooth but contain small recesses or cavities. This results in air and gasses being trapped between the flat surfaces of the preform and the surfaces of the mold within these recesses or cavities. The trapped air and gasses cannot escape as the molds are closed and placed against the preform so that they cause the formation of such defects as voids, blisters and pits in the record surface. Such defects can result in misformed grooves which can cause stylus mistracking. Such defects are even a greater problem and therefore especially undesirable in high density information records, such as video discs, which contain a groove packing density in the order of 10,000 grooves per inch.

SUMMARY OF THE INVENTION

A preform for making a recorded disc includes a body of plastic material having substantially flat top and bottom surfaces and a peripheral surface between the top and bottom surfaces. The peripheral surface has a first portion of a peripheral dimension greater than the peripheral dimensions of the top and bottom surfaces. The peripheral surface also includes second and third portions extending from the first portion to the top and bottom surfaces, respectively. The peripheral dimension of each of the second and third portions decreases from that of the first portion to that of the top and bottom surfaces, respectively.

A recorded disc is made from the preform by placing the preform between a pair of spaced apart heated molds which are closed against the preform causing the plastic material to flow and fill the mold cavity and define the disc contour. The preform is placed between the molds so that the molds first contact the top and bottom surfaces of the preform.

BRIEF DESCRIPTION OF THE DRAWING

FIG. 3 is a schematic view of a portion of a molding press having the preform of the present invention therein.

DETAILED DESCRIPTION

Figure 1:
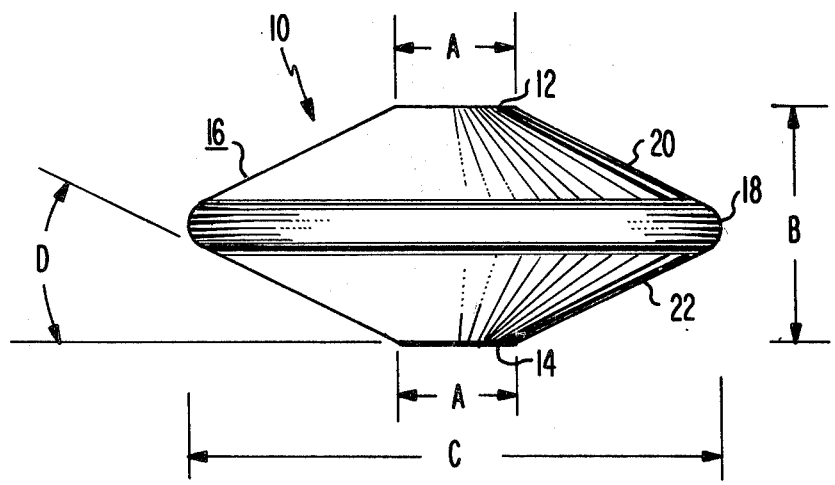
FIG. 1 is a side view of a form of the preform of the present invention.
Figure 2:
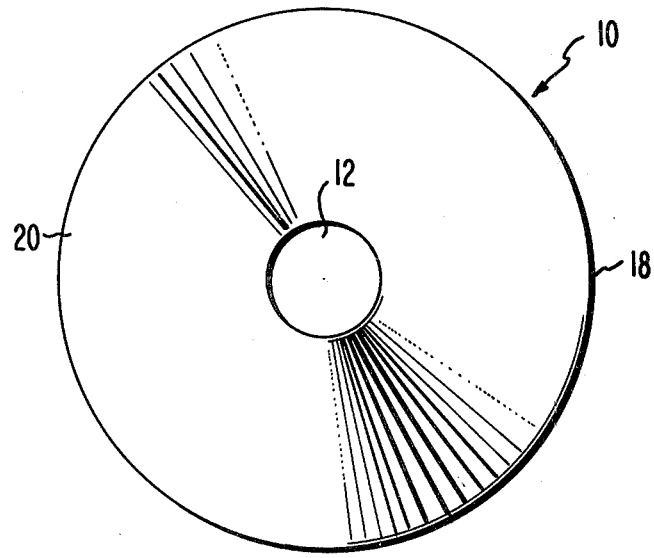
FIG. 2 is a top view of the form of the preform shown in FIG. 1.

Referring to FIGS. 1 and 2, a form of the preform of the present invention is generally designated as 10. The preform 10 is a body of a plastic material of a volume sufficient to provide the desired size of video disc. For example, for a video disc which is 11.90 inches (30 cm) in diameter and 0.076 inches (0.2 cm) thick, the preform 10 should be of a volume of approximately 7.8 cubic inches (128 cc). The preform 10 may be of any plastic material desired for making the video disc. The body 10 includes substantially flat top and bottom surfaces 12 and 14 and a peripheral surface 16 extending between the top and bottom surfaces 12 and 14. The top and bottom surfaces 12 and 14 are preferably circular and have the same peripheral dimension.

The peripheral surface 16 has a first portion 18 substantially intermediate the top and bottom surfaces 12 and 14, a second portion 20 extending from the first portion 18 to the top surface 12, and a third portion 22 extending from the first portion 18 to the bottom surface 14. The first portion 18 is substantially circular and has a peripheral dimension greater than that of the top and bottom surfaces 12 and 14. The second and third portions 20 and 22 have a peripheral dimension which decreases from that of the first portion 18 to that of the top and bottom surfaces 12 and 14, respectively. Since the first portion 18 of the peripheral surface 16 is substantially circular and the top and bottom surfaces 12 and 14 are also circular, the second and third portions 20 and 22 are substantially conical in shape.

The diameter of each of the top and bottom surfaces 12 and 14, indicated as A in FIG. 1, is smaller than the center hole to be formed in the disc. The thickness of the preform 10, i.e. the distance between the top and bottom surfaces 12 and 14 indicated by B in FIG. 1, is such that the preform 10 can be easily placed between the molds of an open press as will be explained. The diameter of the first portion 18 of the peripheral surface 16, indicated by the letter C in FIG. 1, is preferably less than the diameter of the unrecorded center portion of the record, usually referred to as the record label diameter. The angle of each of the second and third portions 20 and 22 of the peripheral surface 16, indicated by the letter D in FIG. 1, is determined by the other dimensions of the preform 10 but is desirable to be as large as possible for reasons which will be explained.

Referring to FIG. 3, there is schematically shown a portion of a record making press 30 in which the preform 10 of the present invention is used. The press 30 includes upper and lower mold plates 32 and 34 which are mounted so that at least one of them is movable toward and away from the other. The mold plates 32 and 34 have aligned central openings 36 and 38 respectively therethrough in which are mounted center plates 40 and 42 respectively. Stampers 44 and 46 are mounted on the opposed surfaces of the mold plates 32 and 34 respectively. The stampers 44 and 46 are thin metal plates having on the surface thereof the negative of the impression to be applied to the surface of the mounted disc. The stampers 44 and 46 are in part secured to the mold plates 32 and 34 respectively by the center plates 40 and 42 respectively. A center hole forming pin 48 extends through and is slidable in the center plate 40 of the upper mold plate 32.

In making a video record disc the mold plates 32 and 34 are separated and the preform 10 of the present invention is placed between the mold plates with the top and bottom surfaces 12 and 14 of the preform 10 being directly between the center plates 40 and 42. As shown in FIG. 3 and as previously stated, the peripheral dimensions of the top and bottom surfaces 12 and 14 are smaller than the hole to be formed by the center hole forming pin 48. When the mold plates 32 and 34 are moved toward each other the first contact between the molds and the preform 10 will be between the center hole forming pin 48 and the top surface 12 and between the center plate 42 and bottom surface 14. Although air and gas may be trapped in the minute recesses in the top and bottom surfaces 12 and 14, this portion of the preform 12 will be pushed aside by the center hole forming pin 48 so that such air and gas will not adversely affect the resulting disc.

As the mold plates 32 and 34 are moved closer together there will be contact between the center plates 40 and 42 and then the stampers 44 and 46 and the surfaces of the second and third portions 20 and 22 of the preform 10. However, since the surfaces of the second and third portions 20 and 22 are angled away from the surfaces of the molds, the contact between the molds and the angled surfaces of the preform will cause the surface of the preform to move radially outwardly and angularly away from the surfaces of the molds. Thus, any air or gas in the minute cavities or recesses in the surface of the second and third portions 20 and 22 will be moved radially outwardly along the preform toward the first portion 18 and away from the surfaces of the molds. This prevents the air and gasses from being trapped along the surface of the disc being formed so as to eliminate, or at least minimize, any defects in the surface of the resulting disc which may be caused by trapped air and gasses. Thus, it can be seen that the preform 10 of the present invention eliminates, or at least minimizes defects in the record disc which may be caused by air and gasses trapped along the surface of the disc during the coating of the disc. Although the preform 10 of the present invention is preferably circular in peripheral shape, it may have other peripheral shape, such as square, octagonal, hexagonal, etc.

I claim:

1. A preform for making a recorded disc comprising a solid body of a plastic material having uninterrupted, substantially flat top and bottom surfaces of the same peripheral dimension and a peripheral surface between the top and bottom surfaces, said peripheral surface having a first portion of a peripheral dimension greater than the peripheral dimensions of the top and bottom surfaces and second and third portions extending from said first portion to the top and bottom surfaces respectively, said second and third portions each being conical so as to have a periperal dimension which decreases from that of the first portion to that of the top and bottom surfaces, respectively.

2. A preform in accordance with claim 1 in which the peripheral dimensions of each of the top and bottom surfaces is smaller than the center hole of the disc to be formed.

3. A preform in accordance with claim 2 in which the peripheral dimension of the first portion of the peripheral surface is smaller than the diameter of the unrecorded center portion of the record to be formed.

* * * * *

UNITED STATES PATENT AND TRADEMARK OFFICE
CERTIFICATE OF CORRECTION

PATENT NO. : 4,460,656

DATED : July 17, 1984

INVENTOR(S) : Michael Lee McNeely

It is certified that error appears in the above-identified patent and that said Letters Patent is hereby corrected as shown below:

In the heading on the front page, insert the following:

-- [30]    Foreign Application Priority Data

April 30, 1979  [GB]  United Kingdom........7914990 --.

Signed and Sealed this

Thirtieth Day of October 1984

[SEAL]

Attest:

GERALD J. MOSSINGHOFF

Attesting Officer    Commissioner of Patents and Trademarks